United States Patent Office 3,197,248
Patented July 27, 1965

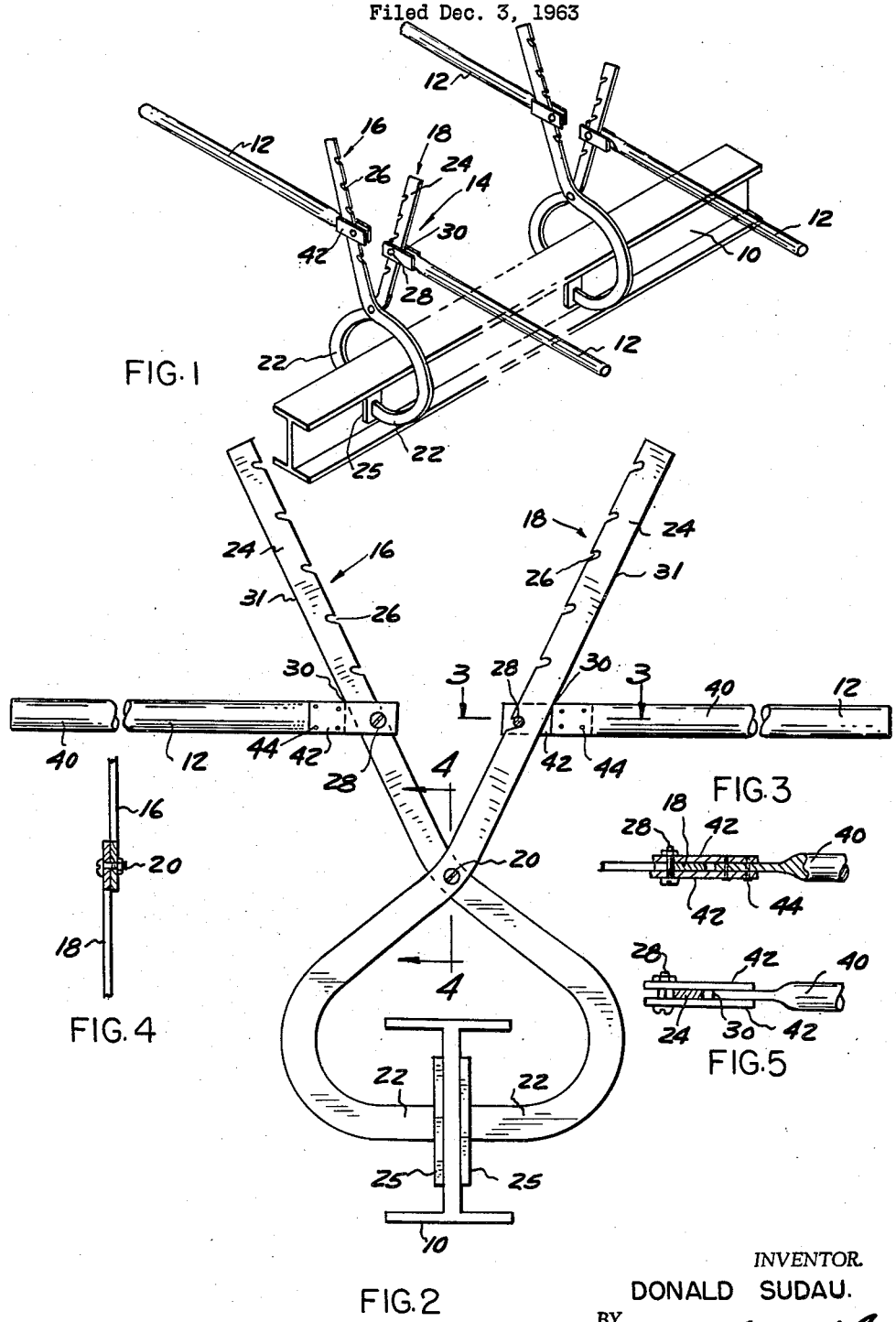

3,197,248
LIFTING MEANS
Donald Sudau, 1529 Kingsley Ave., Mount Clemens, Mich.
Filed Dec. 3, 1963, Ser. No. 327,728
2 Claims. (Cl. 294—16)

This application relates to lifting means of the tong type especially useful for lifting and carrying beams, rails, etc., the tongs having two upper parts manipulated by two men separately. The tongs hereof are characterized by the provision of separate handles for the two tong upper ends, separately and adjustably connected to the tong upper ends, to adjust to differences in height and build and reach of the two men who manipulate the tongs; and the object of the invention is to provide such adjustment for such purposes.

A preferred embodiment of the invention has been shown in the attached drawing, in which FIG. 1 illustrates the use of the tongs.

FIG. 2 is a larger scale view of one pair of tongs per se.

FIG. 3 and FIG. 4 are fragmentary section views on lines 3—3, and 4—4 of FIG. 2.

FIG. 5 is a view like FIG. 3 but showing the parts in a different position.

FIG. 1 of the drawing shows a long beam or rail 10 carried by a four man crew manipulating the four handles 12 of two pairs of X-type tongs 14, each comprising two parts 16-18 pivotally connected between their ends at 20. The lower ends 22 are hooked towards each other, and the upper ends 24 are directed away from each other. Lower ends 22 are fitted with bearing pads or plates 25.

Handles 12 are outside of and are adjustably and separably connected to the upper ends 24. The adjustable connections comprise a series of spaced notches 26 on the inner edge of each upper end, selectively receiving pins 28 on the ends of the handles 12 selectively inserted in notches 26; and abutments 30 on the upper edges of the handles, spaced from pins 28, and positioned to engage the under-outer edges 31 of the tong upper ends 24 as the handles are moved upwardly while beam 10 is grasped by and between the tong lower ends 22. Thus, each handle may be separately adjusted as regards its position in connection with a tong upper end, in relation to the tong lower end and beam 10—to accommodate to differences in height, build and reach of the two men grasping the two handles.

Each handle includes a body part 40 and two straddle plates 42 secured thereto at 44 and connected by a pin 28. The upper edge of the end of the handle body part provides the abutment 30.

An important feature of the tongs herein disclosed is the fact that each handle 12 has an end opening or slot through which may easily be passed a tong upper end 24. Such opening is defined by the two straddle bars or plates 42 riveted to the handle body part at 44. Further defining the opening are the end 30 of the handle body part 40 and the pin 28 which connects the straddle bars at their remote ends, with the handle body end providing the abutment 30.

Normally a handle may be separated from or in any desired assembled position with respect to a tong upper end 24. If the parts are separated, the handle may be slipped over the free end of the tong upper end 24, the latter passing through the handle opening freely because the length of such opening is greater than the width of the tong upper end. Once the handle is assembled on the tong upper end, it may be shifted up or down as desired with the handle at approximately right angles to the tong upper end, and a notch 26 may be selected for receiving a pin 28. Thereupon handle 12 is lifted and swung towards a tong upper end 24 to assume an acute angle as shown in FIG. 2. Abutment 30 of the handle will engage the under-outer edge 31 of the tong upper end 24 for mutual cooperation of handle 12 and tong upper end 24. Accidental separation of handle 12 from tong upper end 24 when the parts are used is prevented by the fact that the handle opening is closed all around by the straddle bars 42 plus the handle body part 40 plus the pin 28.

For all operating purposes, it may be considered that the straddle bars 42 and the pin 28 and the handle body part 40 are integral, though in fact it is more practical to make them separate as shown, but in their operation they operate as if they were integral.

Now having described the embodiment herein shown, reference should be had to the claims which follow.

I claim:

1. Lifting means comprising X-type tongs formed of two generally upright crossing parts pivotally connected between their ends, with their lower ends hooked towards each other, and their upper ends directed away from each other;

and horizontally disposed oppositely extending handles outside of and adjustably and pivotally connected to the tong upper ends;

the adjustable connections comprising a series of spaced notches on the inner edge of each tong upper end;

pins on the ends of the handles selectively inserted in said notches, the handles having abutments spaced from the pins positioned to engage the under-outer edges of the tong upper ends as the handles are moved upwardly while a load is grasped by and between the tong lower ends, whereby each handle may be separately adjusted as regards its position and remain horizontally disposed, in connection with a tong upper end, in relation to the tong lower end and the load grasped thereby;

each handle including an end opening loosely receiving and through which may easily be passed a tong upper end;

with the pin and abutment being at opposite ends of such opening, such opening being closed all around to prevent accidental separation of the handle from the tong upper end, each handle and its pivotal connection and abutment providing increased leverage for securing said load.

2. Lifting means comprising X-type tongs formed of two generally upright crossing parts pivotally connected between their ends, with their lower ends hooked towards each other, and their upper ends directed away from each other; and horizontally disposed oppositely extending handles outside of and adjustably connected to the tong upper ends;

the adjustable connections comprising pins on the ends of the handles extending through the tong upper ends; the handles having abutments spaced from the pins and positioned to engage the under-outer edges of the tong upper ends as the handles are moved upwardly operatively and supportably engaging the two parts while a load is engaged by and between the tong lower ends; whereby each handle may be separately adjusted in connection with a tong upper end and in relation to the tong lower end and the load gripped thereby; and wherein each handle has an end opening loosely receiving and through which extends a tong upper end, with the pin and abutment being at opposite ends of such opening, each handle and its pivotal connection and abutment providing increased leverage for securing said load.

References Cited by the Examiner

UNITED STATES PATENTS

| 822,897 | 6/06 | Lease | 294—16 |
| 1,972,583 | 9/34 | Cullen | 294—118 |

FOREIGN PATENTS

| 319,153 | 4/19 | Germany. |

GERALD M. FORLENZA, Primary Examiner.

SAMUEL F. COLEMAN, Examiner.